United States Patent [19]

Hoerster et al.

[11] 3,922,423

[45] Nov. 25, 1975

[54] FLAMEPROOFING COMPOSITION FOR TEXTILE MATERIALS AND PROCESS OF MAKING AND USING SAME

[75] Inventors: Herbert Hoerster, Hofheim, Taunus; Hans Schaffner, Boeblingen, both of Germany

[73] Assignee: Schill & Seilacher, Verwaltung GmbH, Germany

[22] Filed: May 25, 1973

[21] Appl. No.: 363,970

[30] Foreign Application Priority Data

May 25, 1972 Germany............................ 2225362

[52] U.S. Cl. ................. 428/262; 427/390; 427/392; 427/394; 427/396; 428/921; 252/8.1; 260/553;

[51] Int. Cl.² .................... C09D 1/00; C07C 127/00 B27K/3/00

[58] Field of Search ................. 117/136; 106/15 FP; 252/8.1; 260/953; 427/390, 392, 394, 396; 428/262, 921

[56] References Cited

UNITED STATES PATENTS

| | | | |
|---|---|---|---|
| 2,678,330 | 5/1954 | Gorder et al. ...................... | 260/960 |
| 3,285,774 | 11/1966 | Goldstein et al..................... | 117/136 |
| 3,488,139 | 1/1970 | Vullo .................................. | 117/136 |
| 3,490,985 | 1/1970 | Marzocchi et al................... | 117/138 |
| 3,619,113 | 9/1971 | Stockel et al. ...................... | 117/136 |
| 3,726,639 | 4/1973 | Prentice et al...................... | 117/136 |
| 3,781,388 | 12/1973 | Jenkner et al. ..................... | 260/953 |
| 3,791,854 | 2/1974 | Miles et al. ......................... | 117/136 |
| 3,832,227 | 8/1974 | Weil et al. .......................... | 117/136 |

*Primary Examiner*—Douglas J. Drummond
*Attorney, Agent, or Firm*—Erich M. H. Radde

[57] ABSTRACT

The agent for flameproofing textile materials of the present invention is a reaction product of an acidic alkyl or halogeno alkyl partial ester of phosphoric acid with epihalogenohydrins which is applied directly to the textile material in the form of aqueous emulsions or, especially in combination with halogeno alkyl phosphates, in the form of solutions in organic solvents such as perchloro ethylene or to printing pastes, coating and finishing compositions. Said reaction products can be condensed on and with the fiber of the textile material by the addition of N-methylol amino compounds, such as N-methylol melamine. The flameproofing finish is durable and resistant to laundering and dry cleaning.

16 Claims, No Drawings

FLAMEPROOFING COMPOSITION FOR TEXTILE MATERIALS AND PROCESS OF MAKING AND USING SAME

BACKGROUND OF THE INVENTION

1. Field of the Invention

The present invention relates to flameproofing agents and compositions for textile materials and more particularly to novel, highly effective, and durable flameproofing agents and compositions which are resistant to laundering and dry cleaning, to a process of making such agents and compositions, and to the methods of using them for making textile materials flame-resistant.

2. Description of the Prior Art

There have been described in patents and the technical and trade literature numerous processes and chemical agents and compositions for flameproofing textile materials in such a manner that they retain their flame-resistance even on repeated laundering and on dry cleaning. More particularly flameproofing by means of tris(1-aziridinyl) phosphine oxide (APO), tetrakis-(hydroxy methyl) phosphonium chloride (THPC), phosphorus nitrilochloride, and the like agents may be mentioned in this respect. Said agents have been varied at least partly by subjecting them to chemical reactions in order to improve the flameproofing effects achieved thereby as well as their technique of use. However, said known agents display considerable disadvantages such as changes in the color of dyed textile materials, considerable reduction of the breaking strength, a stiff or rigid feel or handle, high toxicity, and that they require frequently expensive special apparatus. Therefore, they have found only very limited use.

U.S. Pat. No. 2,725,311 discloses the use of bis-(halogeno alkyl) halogeno alkane phosphonates as flameproofing agents for cellulose. Thereby the flameproofing treatment is effected with solutions of said agents in organic solvents, especially in benzine and the like. Said patent describes mainly a finishing treatment of wood with such agents. This method has not become of particular importance for rendering textile materials flame-resistant.

U.S. Pat. No. 2,803,562 discloses the use of bis-(2-halogeno alkyl) alkenyl phosphonates for flameproofing cellulose. Bis-(2-chloroethyl) vinyl phosphonate is mentioned as an example of such agents. Said phosphonates are also used in the form of solutions in inflammable organic solvents which solutions are applied solely to wood. This method like the method mentioned hereinabove, has not been used industrially for finishing textile materials more particularly because no durability at all, or at the most an entirely unsatisfactory durability of the flameproofing finish against laundering and dry cleaning is achieved.

U.S. Pat. No. 2,678,330 finally discloses flameproofing of cellulose by means of bis-(2,3-dihalogeno propyl) chloro phosphonates. Although processes of producing such agents are described in said patent, there is given no description for actually carrying out the reaction of said phosphonates with cellulose and more particularly with textile materials. The above mentioned phosphonate compounds, as is well known, are very sensitive to hydrolysis and decompose already on standing in contact with air whereby hydrochloric acid is split off. Therefore, the reaction of said agents with the hydroxyl groups of cellulose must be carried out under anhydrous conditions. Anhydrous conditions, however, limit considerably the usefulness of this flameproofing process on an industrial scale. Besides 1 mole of hydrochloric acid is split off from each mole of flameproofing agent so that the problem of fiber damaging is encountered thereby. Thus this process has not achieved any industrial importance.

SUMMARY OF THE INVENTION

It is one object of the present invention to provide a novel and highly effective flameproofing agent for textile materials, said agent being substantially free of the disadvantages of the heretofore suggested and used flameproofing agents and rendering textile materials substantially flameproof in a simple and effective manner, the resulting flameproof finish being resistant to laundering and dry cleaning.

Another object of the present invention is to provide novel and highly effective flameproofing compositions based on such flameproofing agents, said compositions also being free of the disadvantages of known flameproofing compositions.

A further object of the present invention is to provide simple and highly effective printing compositions and especially printing pastes which are flame-resistant and the flame-resistance of which is not diminished on repeated laundering and/or dry cleaning.

Still another object of the present invention is to provide water-free flameproofing solutions which are useful for flameproofing, for instance, printed staple fiber textile material and which are substantially free of the disadvantages of known flameproofing solutions.

Another object of the present invention is to provide a simple and effective process of producing such novel and advantageous flameproofing compositions.

Another object of the present invention is to provide a simple and effective method of flameproofing textile materials with such agents, compositions, solutions, and the like.

Other objects of the present invention and advantageous features thereof will become apparent as the description proceeds.

In principle the flameproofing agents according to the present invention are reaction products obtained by reacting a compound of the formula

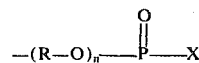

in which
R is alkyl or halogeno alkyl with 1 to 5 carbon atoms and especially 2,3-dibromo, propyl,
X is hydroxyl or halogen, and
n is a numeral from 0.5 to 2.5, with an 1,2-epihalogeno hydrin. Finishing of textile materials with such reaction products yields in a simple manner flameproof finishes which are resistant to repeated laundering and/or dry cleaning. Preferably said reaction products are emulsified in water with the aid of an emulsifier which does not affect, and/or react with, the reaction products. If desired, N-methylol amino compounds, preferably N-methylol melamines are added to such emulsions. The textile material to be finished is padded with said emulsions, excess emulsion is squeezed off, the finished textile material is dried, and subsequently condensation reaction is effected. Apparatus as they are conventionally used for textile finishing are employed in the flameproofing treatment according to the present invention. Immediately after condensation has taken place the textile material has an agreeable feel. It need not be subjected to subsequent washing for most of its subsequent uses.

The use of the agents and compositions according to the present invention is not limited to the flameproofing finishing treatment of textile materials. They can also be added, for instance, to printing pastes as flameproofing agents. This use is, for instance, of importance when printing noncombustible textile materials. Thus, for instance, the excellent flame-resistance of glass fiber fabrics is preserved even after printing. In an analogous manner it is also possible to add the reaction products according to the present invention to conventional dressing or finishing preparations in order to prevent deterioration of the flame-resistance of the base textile material by the finishing treatment.

When using the reaction products according to the present invention together with N-methylol amino compounds, the possibility exists that said reaction products react with the N-methylol amino compounds. On the other hand, the N-methylol amino compounds can react, due to the different functional groups thereof, at the same time with the hydroxyl groups of the cellulose. As a result thereof, the reaction products according to the present invention can be bound directly to the cellulose fiber by means of said N-methylol amino compounds.

The reaction products according to the present invention can also be reacted with N-methylol amino compounds before they are applied to the textile materials. Thereby, there are obtained in most instances pulverulent, insoluble reaction products which can also be used as flameproofing agents. They are especially useful as flame-retardant additives in coating compositions with which textile materials are covered or coated, and also as additives to compositions from which synthetic fibers and regenerated cellulose fibers are spun.

The reaction products according to the present invention are produced in a simple manner by first reacting phosphorus pentoxide or phosphorus oxychloride with the corresponding alcohol or halogenated alcohol to yield the acidic partial ester or partial ester chloride of phosphoric acid. The partial ester chloride is then preferably saponified to the acid partial ester. Subsequently the resulting acidic partial ester is reacted with 1,2-epihalogenohydrin. The reaction products obtained thereby are usually liquid compounds which are insoluble in water as well as in perchloro ethylene. On reaction with N-methylol amino compounds, they yield solid, pulverulent condensation products.

DESCRIPTION OF THE PREFERRED EMBODIMENTS

The following examples serve to illustrate the preparation of such reaction products according to the present invention without, however, limiting the same thereto.

EXAMPLE 1

Reaction Product A 142 g. of phosphorus pentoxide are added to
654 g. of 2,3-dibromo propanol-(1), while stirring and cooling. The temperature during said reaction should not exceed 80° C. Thereafter, stirring of the reaction mixture at said temperature is continued for about one hour and unreacted phosphorus pentoxide is filtered off.

200 g. of epichlorohydrin are added gradually to
398 g. of the resulting acidic ester,
while stirring. During addition of the epichlorohydrin, the temperature increases to the boiling point of the epichlorohydrin. Therefore, the reaction is carried out in a vessel provided with a reflux condenser. After addition of the epichlorohydrin is completed, the reaction mixture is heated to boiling under reflux for about one hour until an aqueous extract of the reaction product has a pH-value of about 6.0.

EXAMPLE 2

Reaction Product B 153 g. of phosphorus oxychloride and
460 g. of 2,3-dibromo propanol-(1)
are mixed with each other, while stirring. The hydrochloric acid split off thereby is removed at 90° C. in a water-jet vacuum. The reaction is completed after about 7 hours. The resulting ester chloride is repeatedly washed with water at a temperature of about 40° C., whereby it is saponified to the corresponding acidic ester, which is then dried.

497 g. of the resulting acidic ester are reacted with
125 g. of epichlorohydrin
as described in Example 1 for the preparation of Reaction Product A.

The reaction products obtained according to Examples 1 and 2 are insoluble in water and perchloro ethylene, i.e., tetrachloro ethylene. For using said reaction products as flame-retarding agents they are converted by means of emulsifiers into aqueous emulsions. To use the reaction products in the form of a finishing solution in an organic solvent as they are preferably employed recently, whereby the organic solvent is a chlorinated hydrocarbon and more particularly perchloro ethylene, they are mixed with their analogous triesters, for instance, with tris(2,3-dibromopropyl) phosphate. Such mixtures form clear solutions in perchloro ethylene. Thus it is possible to apply the reaction products according to the present invention for flameproofing by means of the solvent process without the use of emulsifiers. The resulting flameproofing finish is highly resistant to laundering and dry cleaning.

The following examples of flameproofing finishing compositions illustrate the present invention and the flameproofing finishing methods employed as well as the resulting flame-retarding effect without, however, being limited to said examples. In principle it is possible to flameproof other textile material than those given in the examples. Thereby, of course, it is necessary to adjust in each instance the amounts of flameproofing agent depending upon the weight per square meter and the structure and composition of the textile material to be flameproofed. Such adjustment is not only required for the flameproofing compositions according to the present invention, but, as is known, for flameproofing agents and compositions in general. The amounts given in the following examples indicate parts by weight.

EXAMPLE 3

A well desized cotton fabric of the twill-weave type which has been dyed with naphthol dyes, said fabric being of a weight of 260 g./sq.m., is padded with a bath composed of
230 parts of the reaction product A of Example 1,
230 parts of tris-(2,3-dibromopropyl) phosphate,
180 parts of a melamine resin (68%),
20 parts of urea, 50 parts of an emulsifier, and
290 parts of water.

The thus padded fabric is squeezed out so that an amount of the flameproofing composition corresponding to 100% of the weight of the fabric remains therein, and is dried at 100° C. Thereafter, the fabric is heated for 4 minutes at 160° C. to cause condensation reaction, i.e., curing.

The same condensation reaction is achieved by heating the fabric flameproofed by the above given emulsion for 6 minutes at 150° C. or for 3 minutes at 170° C.

The resulting flameproofed fabric does not exhibit any distinct disagreeable odor even without being washed subsequently. The naphthol color tone is not affected by said treatment. After flameproofing the fabric has a good dimensional stability. The warp shrinkage amounts to only about 2% compared with about 8 to 9% without the flameproofing finish. Laundering tests show a Monsanto picture of at least 4, even after laundering the fabric 20 times.

When testing the treated fabric for its fire-resistance according to the standard DIN 53 906 provisions the cotton fabric treated as described in Example 3, does not show any after-flaming or after-glow. These properties are retained even after laundering the fabric 20 to 25 times by boiling in a washing machine, whereby the conventional household washing detergents are used, and also after subjecting the flameproofed fabric 30 times at 35 times to a dry cleaning treatment with perchloroethylene containing 2 g./liter of a cleaning intensifier and 5 g./liter of water as employed in commercial dry cleaning establishments.

The durability and wearability of the fabric is no more impaired by the above described flameproofing treatment than by a conventional finishing treatment for rendering the fabric crease-resistant. The breaking strength and the resistance to tearing of the twill cotton fabric used in the present examples is reduced by only about 10% to 15%. The abrasion resistance measured by the Accelorotor test (3,000 revolutions per minute for 3 minutes) was changed from a loss in weight of 4% before the flameproofing treatment to 12% after flameproofing. The flameproofed fabric can be made up and worked without difficulty.

EXAMPLE 4

A pinned or needled polyester felt of a weight of about 400 g./sq.m. is padded with a bath composed of
350 parts of the reaction product B of Example 2,
120 parts of a melamine resin (68%).
40 parts of an emulsifier, and
490 parts of water.

The treated felt is squeezed out, dried, and heated at 155°C. for 3 minutes to cause condensation. The weight of the felt increases by about 45% due to this flameproofing treatment. The flame-resistance is excellent when tested according to the provisions of DIN 53 906 and DIN 53 382. After-flaming for 3 seconds, at the most, is observed. In contrast thereto, the untreated felt burns completely when tested in the same manner. The permeability to air is decreased by the flameproofing treatment by about 12% only.

The flameproofed felt is used as hot-air filter in the wood processing industry continuously at temperatures of 150°-170° C. The low inflammability of the felt is not changed by such a continuous action of high temperatures. Many flameproof finishes, especially those based on ammonium compounds, lose their flame-resistance when exposed to such temperatures for a prolonged period of time. The filters flameproofed according to the present invention can be subjected to any required cleaning treatment from time to time without impairment of their low inflammability.

EXAMPLE 5

Synthetic resins based on acrylic polymers are used for fixing pigment dyestuffs used for printing glass fiber fabrics. Such pigment compositions, however, burn very readily and thus impair the fire-resistance of the glass fiber fabric especially when blotch printed or of large area design. The acrylic binder film, however, can be rendered difficultly inflammable by admixing thereto the reaction products according to the present invention.

To the printing paste consisting of emulsifier, pigment, binder, white spirit, and water, there is added the reaction product A or B of Examples 1 or 2 and melamine resin. Both additives can readily and satisfactorily be emulsified in the printing paste. A test with a well coronized glass fiber fabric (glass silk) of a weight of about 150 g./sq.m. showed a durable flameproofing effect resistant to laundering and dry cleaning by adding to the printing paste, in place of its water component,
250 g. of the reaction product A or B of Examples 1 or 2,
90 g. of melamine resin (68%), and
20 g. of an emulsifier for each kg. of ready made printing paste. The paste can be used satisfactorily for printing by means of a rotary film printing machine. The engravings remain clean even on continuous operation.

The printed glass fiber fabric is dried at 100° C. and is heated to 150° C. for four minutes to cause condensation reaction.

Other known flameproofing additives caused stiffness in such a material, while the use of the reaction products according to the present invention produce a soft, smooth, and pleasant feel.

The flame-resistance of glass fiber fabrics printed with the reaction products of this invention and tested according to the provisions of DIN 53 906 is durable on laundering at 40° C. or on dry cleaning with perchloro ethylene. Adherence of the pigments to the glass fiber fabric, i.e., the color fastness of the printed fabric is not affected by the flameproofing treatment. More particularly the abrasion resistance is not impaired.

EXAMPLE 6

A printed staple fiber dyed with a decorative color of a weight of about 200 g./sq.m. is treated with a solution of
110 g. of the reaction product B of Example 2,
110 g. of tris-(2,3-dibromopropyl) phosphate,
40 g. of an etherified melamine resin,
10 g. of trichloro acetic acid, and
730 g. of perchloro ethylene.

The textile fabric is padded with such a solution. The bath take-up amounts to about 150%. The treated fabric is predried at 100° and is then heated at 150° C. for 4 minutes, whereby condensation reaction takes place. The fabric does not have a disagreeable odor. It has an agreeable full feel. The color of the printing is not affected.

The fabric flameproofed in this manner shows on testing according to the provisions of DIN 53 906 no afterflaming and no after-glow. These properties are preserved even after at least 25 to 30 launderings in washing machines at 60° C., using a household washing machine and a program designed for washing colored goods with commercial detergents, as well as after 30 to 40 dry cleaning operations using perchloro ethylene containing 2 g./l. of a cleaning intensifier and 5 g./l. of water. The flameproofed fabric has also an improved dimensional stability of laundering. Shrinkage of the flameproofed fabric is reduced from 10% to 12% before the finishing operation to 3% to 4% thereafter. Laundering samples dry almost smoothly (Monsanto picture 4).

The tearing strength is not affected by the flameproofing treatment and the abrasion strength measured in the accelorotor test (2,500 revolutions per minute for three minutes) is changed from 6% before flameproofing to 14% of the flameproofed fabric.

We claim:

1. In a process of durably flameproofing textile materials, the steps which comprise applying to the textile material (A) the reaction product of a compound of the formula

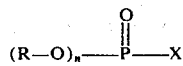

in which

R is a member selected from the group consisting of alkyl and halogen substituted alkyl with 1 to 5 carbon atoms, n is a numeral between 0.5 and 2.5, and x is a member selected from the group consisting of hydroxyl and halogen, with a 1,2-epihalogenohydrin together with (B) an N-methylol amino compound and drying and subjecting the thus treated textile material to condensation reaction.

2. The process of claim 1, in which the N-methylol compound is an N-methylol melamine.

3. The process of claim 1, in which the reaction product and an N-methylol amino compound are admixed to and incorporated into a printing paste, the textile material is printed therewith, and is then dried.

4. The process of claim 1, in which the reaction product and an N-methylol amino compound are admixed to and incorporated into a coating composition, the resulting coating composition is applied to the textile material, and the textile material is dried.

5. The process of claim 1, in which the reaction product and an N-methylol amino compound are admixed to and incorporated into a finishing composition, the resulting finishing composition is applied to the textile material, and the treated textile material is dried.

6. The process of claim 1, in which the reaction product is first reacted and condensed with an N-methylol amino compound, the resulting condensation product is mixed with an incorporated into a printing paste as flame-retarding agent, whereafter the printing paste is applied to the textile material.

7. The process of claim 1, in which the reaction product is first reacted and condensed with an N-methylol amino compound and the resulting condensation product is admixed to and incorporated into a coating composition as flameproofing agent for textiles, whereafter the coating composition is applied to the textile material.

8. The process of claim 1, in which the reaction product is first reacted and condensed with an N-methylol amino compound and the resulting condensation product is admixed to and incorporated into a finishing composition as flameproofing agent, whereafter the finishing composition is applied to the textile material.

9. The process of claim 1, in which the reaction product is applied to the textile material together with a halogeno alkyl phosphate.

10. The process of claim 9, in which the halogeno alkyl phosphate is tris-(2,3-dihalogeno propyl) phosphate.

11. The process of claim 9, in which the reaction product and the N-methylol amino compound are dissolved together with a halogeno alkyl phosphate in an organic solvent without the use of an emulsifier and the resulting solution is applied to the textile material for flameproofing the same.

12. The process of claim 11, in which the organic solvent is a chlorinated aliphatic hydrocarbon.

13. The process of claim 12, in which the organic solvent is perchloro ethylene.

14. A flame-resistant textile material retaining its flame-resistance properties on repeated laundering and dry cleaning, said textile material having applied thereto, as flameproofing agent, (A) the reaction product of a compound of the formula

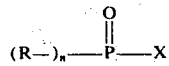

in which

R is a member selected from the group consisting of alkyl and halogen substituted alkyl with 1 to 5 carbon atoms, n is a numeral between 0.5 and 2.5, and X is a member selected from the group consisting of hydroxyl and halogen, with a 1,2-epihalogenohydrin and (B) an N-methylol amino compound.

15. The flame-resistant textile material of claim 14, having additionally applied thereto a halogeno alkyl phosphate.

16. The flame-resistant textile material of claim 14, wherein said N-methylol amino compound is an N-methylol melamine.

* * * * *

PO-1050
(5/69)

UNITED STATES PATENT OFFICE
CERTIFICATE OF CORRECTION

Patent No. 3,922,423          Dated November 25, 1975

Inventor(s) HERBERT HOERSTER and HANS SCHAFFNER

It is certified that error appears in the above-identified patent and that said Letters Patent are hereby corrected as shown below:

Column 5, line 29: "at" should read -- to --.

Column 7, line 8: "of", first occurrence, should read -- on --.

Column 8, line 1: "an" should read -- and --.

Column 2, lines 45 to 49: The formula

" $-(R-O)_n-\overset{\overset{O}{\|}}{P}-X$ " should read -- $(R-O)_n-\overset{\overset{O}{\|}}{P}-X$ --

Column 8, lines 38 to 42: The formula

" $(R-)_n-\overset{\overset{O}{\|}}{P}-X$ " should read -- $(R-O)_n-\overset{\overset{O}{\|}}{P}-X$ --

Signed and Sealed this twenty-fourth Day of February 1976

[SEAL]

Attest:

RUTH C. MASON
*Attesting Officer*

C. MARSHALL DANN
*Commissioner of Patents and Trademarks*